March 6, 1934.   R. B. FAGEOL   1,949,830
DUAL DRIVE MULTIWHEEL ROAD VEHICLE
Filed Dec. 5, 1929
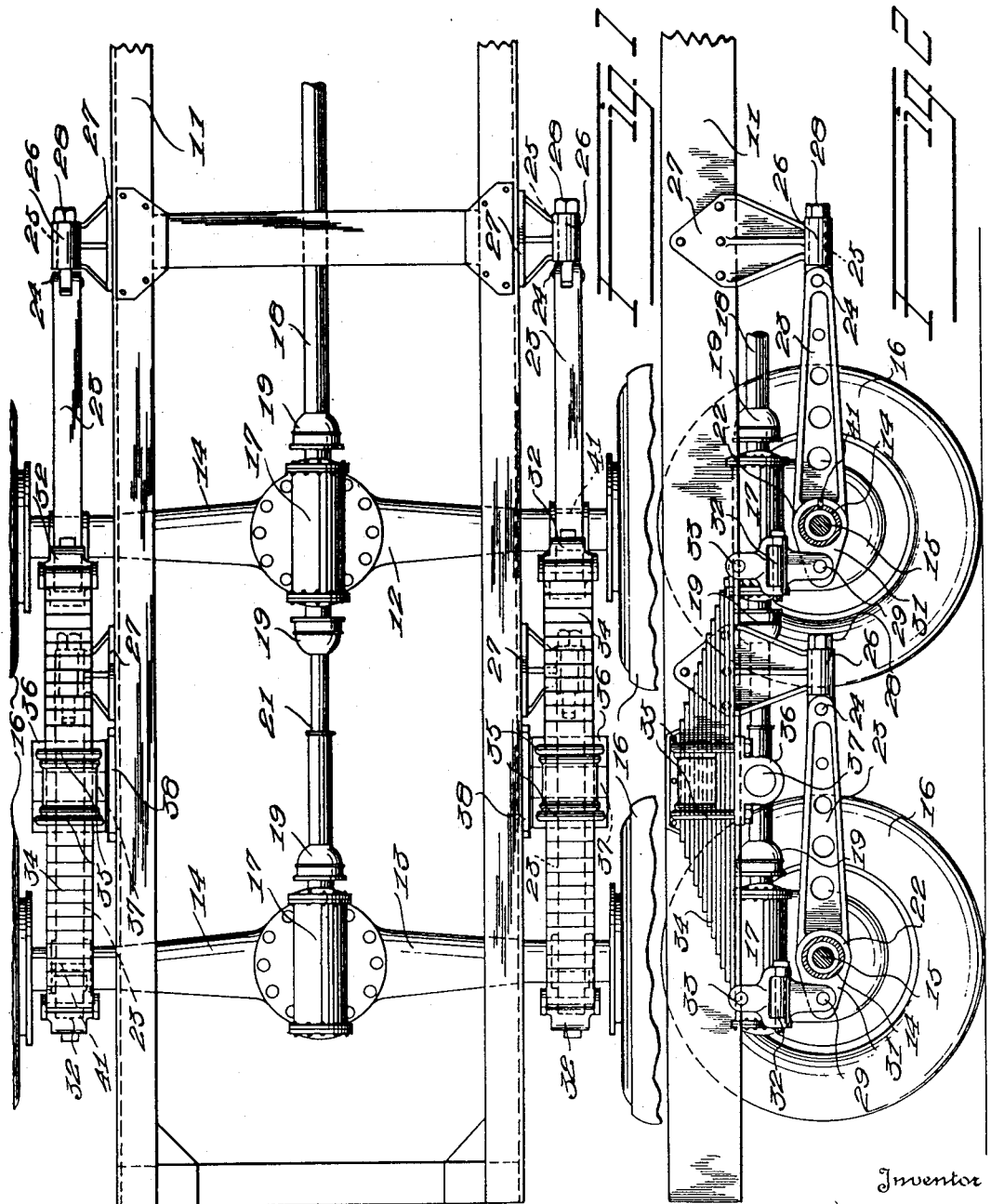
Inventor
Rollie B. Fageol
By Strauck & Hoffman
Attorneys Patented Mar. 6, 1934

1,949,830

UNITED STATES PATENT OFFICE 1,949,830

DUAL DRIVE MULTIWHEEL ROAD VEHICLE

Rollie B. Fageol, Los Angeles, Calif., assignor, by mesne assignments, to Automotive Engineering Corporation, a corporation of Delaware Application December 5, 1929, Serial No. 411,912

4 Claims. (Cl. 280—104)

The present invention relates to multi-wheel road vehicles.

More particularly, the invention relates to multi-wheel road vehicles of the type that includes tandem drive axles supported by tandem wheels adjacent the rear of the vehicle, and to means for positioning and at the same time resisting the torque reactions.

The present invention includes tandem axles, both of which are preferably driven, although not necessarily limited thereto, the invention particularly relating to the connections between the axles and vehicle frame, the spring suspensions, and the brake or drive torque resisting arrangements for the axles.

The primary object of the invention is to provide a multi-wheel vehicle having a high degree of flexibility, though the construction of this application is not too flexible so that the relative positions of the axles, the springs and the frame are not always maintained even under the most severe conditions of service. In other words, this invention aims to provide a multi-wheel construction of controlled flexibility.

To this end the axles are definitely positioned endwise of the frame of the vehicle by arms that do not restrict the rising and falling of the axles or the tilting thereof in substantially vertical planes containing the longitudinal axes of the several axles. Such arms, rather than the springs determine the positions of the several axles, while the springs serve to cushion and limit the movements of the axles in the directions in which the arms permit them to move. At the same time the connections between the springs and arms are such that the intended movements of the axles are not hampered and hence the springs are not subjected to twisting stresses when the axles tilt in the substantially vertical planes that contain their longitudinal axes.

Constructions having the controlled flexibility just referred to require arangements to resist the braking and driving torque reactions, since the flexibility of the connections between the springs, the axles, and the frame are of such character that these reactions can not successfully be resisted by the springs. A further object of this invention is to provide a construction of the character stated, in which the braking and driving torque reactions are effectively resisted independently of the springs without impairing the flexibility of the construction and without necessitating the use of separate interconnections between the frame and the axles.

To this end, the arms that position the axles endwise of the frame are made to resist the driving or braking reactions, so that the functions are served in an extremely simple manner without the addition of extraneous specially provided elements for said functions.

A further object of the invention is to utilize the axle positioning arms to resist the torque reactions without substantially impairing the flexibility of the construction considered as a whole.

With the above objects in view as well as others that will become apparent during the course of the following disclosure, reference will be had to the accompanying drawing forming part of same and wherein:

Figure 1 is a broken top plan view of the rear portion of the chassis of a multi-wheel road vehicle constructed in accordance with a preferred embodiment of my invention.

Figure 2 is a vertical longitudinal sectional view of the construction illustrated in Figure 1, the section being taken immediately inwardly of the rear wheels in Figure 1.

Referring to the drawing by reference characters in which like characters designate like parts 11 designates the frame of the vehicle which may be of the usual channel type construction, the front end of which (not shown) is supported by the usual dirigible wheels.

Disposed adjacent the rear end of frame 11 is a pair of longitudinally spaced axles 12 and 13, which are preferably of like construction, each embodying an axle housing 14 in which is rotatably journaled a pair of drive axle sections 15 to the outer ends of which are secured drive wheels 16.

The axle sections 15 are differentially driven through worm gear drives 17, which in turn are jointly driven by a through drive shaft 18 operatively connected with the transmission (not shown) and provided with universal joints 19 adjacent the worm drives 17 and also provided between drives 17 with a slip splined connection 21 for providing maximum flexibility in the drive shaft.

Rotatably journaled on each axle housing 14 adjacent each end thereof is the hub portion 22 of an arm or radius rod 23. The arms or radius rods 23 are relatively long and are normally disposed in parallel relation and longitudinally of frame 11 with hub portions 22 arranged near the rear ends thereof. The forward ends of rods 23 are pivotally connected, as indicated at 24, to the rear ends of rods 25 swivelly mounted in cylindrical terminals 26 of brackets 27 suitably secured to frame 11. The forward ends of rods 25 are threaded for the reception of nuts 28 for removably maintaining rods 25 within members 26 while permitting rotation of rods 25 about their longitudinal axes within members 26. Inasmuch as rods 25 turn in terminals 26 and pins 24 provide for pivotal movement about an axis at right angles to said terminals, universal connections are provided between the forward ends of arms 23 and frame 11, so that twisting strains in said arms are avoided when the axles tilt in substantially vertical planes.

Pivotally connected as at 29 to rear extensions 31 of arms 23 are the inner ends of interchangeable universal shackles 32, while pivotally connected, as at 33, to the outer ends of the longitudinally spaced shackles 32, at each side of frame 11, are the opposite ends of a leaf spring assembly 34.

The spring assemblies 34 are connected at the mid portions thereof by U-bolts 35 to spring seats or saddles 36 which are pivotally mounted on stub shafts 37 projecting laterally of frame 11 in transverse alinement from brackets 38 secured to said frame.

It will be seen from the foregoing disclosure that each axle housing 14 is connected with frame 11 by a pair of arms 23 in such manner that the axle is permitted to move vertically about pivotal connections 24 when the wheels 16 that support the axles move over road irregularities encountered by said wheels, and that either end of either axle is permitted to freely rise or fall relative to the opposite end without imposing strain on the pivotal connections 24 due to the swivel connections 25.

It will further be seen that both axles, through the extensions 31, have, in effect, universal connections with the opposite ends of springs 34 which are pivotally connected intermediate their ends to frame 11 so that the springs freely yieldingly resist the axle movements without serving to position the axles endwise of the frame.

Accordingly, the construction disclosed provides flexible connections between the axles and vehicle frame to position the axles and yieldable connections between the axles and frame for cushioning their movements thus providing maximum flexibility so that each and every drive wheel, or all in unison, may move vertically without imposing strain on any of the connecting parts.

The driving aid or braking torque reactions on axle housings 14, 15, is in accordance with my present invention resisted by the arms 24, thus avoiding extraneous connections for these purposes. To this end of each axle housing 14 is keyed an associated radius rod hub portion 22 as indicated at 41. By securing one end only of each axle housing in the manner disclosed, the driving and braking torque reactions on the axle housing are effectively resisted without substantially affecting the flexibility of the construction. Diagonally opposite ends of the axles may be keyed to the arms, or the keys may be provided for both axles on the same side of the vehicle. If desired, keys may be provided for each arm or the axles may be non-rotatively mounted in the arms in any desired manner.

It will readily be seen from the foregoing disclosure that a multi-wheel vehicle construction is provided of simplicity, though embodying the desirable characteristics above alluded to; that the construction in accordance with the present invention is of controlled rather than unlimited flexibility; that the arms 23 serve not only to position axle housing 14 endwise of frame 11, but that they are further utilized to resist the driving and braking torque reactions on axle housings 14 so that separate torque resisting means are not required.

While I have disclosed springs 34 disposed above axle housings 14 the springs may by slight alterations in the construction disclosed be underslung without departing from the spirit of the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. In a multi-wheel road vehicle, a frame; tandem axles arranged beneath one end of said frame, each being a full transverse axle; a pair of substantially parallel arms interconnecting each axle with the frame to position the axles longitudinally of the frame, the parallel arms of each pair being connected to the ends of the corresponding axle and at least one of said arms being designed to transmit any torque reactions of its axle to the frame; and a suspension for mounting the frame upon the axles; the frame connections of the arms each comprising an element designed to swivel about an axis that is longitudinal of the frame and a horizontal pivot pin carried by said swiveling element.

2. In a road vehicle construction, a frame; a set of axles arranged in tandem beneath one end of said frame, the foremost axle being a full transverse driven axle; a suspension for mounting and positioning said frame end upon said axles; said suspension including a pair of substantially rigid inextensible arms connected in parallelism between the ends of the foremost axle and the sides of said frame, at least one of said arms being designed to prevent rotation of the axle about its axis in response to driving torque reactions and both of said arms embodying means permitting said axle to swing and tilt without restriction during operation of the vehicle; a spring pivoted upon each side of the frame with its ends adjacent the corresponding ends of the axles, and means universally connecting each axle with its adjacent spring end.

3. In a multi-wheel vehicle, a frame; a pair of transverse axles disposed in tandem beneath one end of said frame; a suspension beam pivoted on each side of the frame adjacent said axles, and universal connections between the ends of each beam and the corresponding ends of the axles; a pair of substantially parallel axle-positioning arms individual to each axle, each pair of said arms being swivelingly connected to the frame and directly connected to the ends of its corresponding axle in a manner to permit unrestricted tilting and swinging of said last mentioned axle; and means for causing at least one of said arms to resist any torque reactions set up in the axle to which it is connected.

4. In a multiwheel road vehicle, a chassis frame; a pair of transverse axles disposed in tandem beneath one end of said frame; a pair of substantially rigid radius arms individual to the ends of each axle, with means for pivotally and directly connecting the ends of the arms with the frame and axles respectively in a manner to permit the latter to swing and tilt freely relative to the frame, at least one of said arms being designed to transmit any torque reactions from its corresponding axle to the frame; and a suspension at each side of the frame comprising a beam pivoted between its ends in a manner to position said beam ends adjacent the corresponding axle ends, and connecting devices between the spring ends and the axle ends permitting a slight unrestricted relative movement of each axle end laterally of the vehicle as said axle end moves vertically independently of its other end.

ROLLIE B. FAGEOL.